(12) United States Patent
Shin et al.

(10) Patent No.: US 12,331,144 B2
(45) Date of Patent: Jun. 17, 2025

(54) METHOD OF PREPARING MALEIMIDE-BASED COPOLYMER

(71) Applicant: LG CHEM, LTD., Seoul (KR)

(72) Inventors: Min Seung Shin, Daejeon (KR); Min Cheol Ju, Daejeon (KR); Sung Won Hong, Daejeon (KR); In Soo Kim, Daejeon (KR); Hyung Sub Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 693 days.

(21) Appl. No.: 17/624,561

(22) PCT Filed: Nov. 25, 2020

(86) PCT No.: PCT/KR2020/016774
§ 371 (c)(1),
(2) Date: Jan. 3, 2022

(87) PCT Pub. No.: WO2021/112474
PCT Pub. Date: Jun. 10, 2021

(65) Prior Publication Data
US 2022/0275127 A1     Sep. 1, 2022

(30) Foreign Application Priority Data

Dec. 5, 2019   (KR) .......................... 10-2019-0160503
Nov. 23, 2020  (KR) .......................... 10-2020-0158008

(51) Int. Cl.
*C08F 222/40* (2006.01)
*C08F 2/18* (2006.01)
*C08F 212/08* (2006.01)
*C08F 220/44* (2006.01)

(52) U.S. Cl.
CPC ............ *C08F 222/402* (2020.02); *C08F 2/18* (2013.01); *C08F 212/08* (2013.01); *C08F 220/44* (2013.01)

(58) Field of Classification Search
None
See application file for complete search history.

(56) References Cited

U.S. PATENT DOCUMENTS

| 4,525,536 | A  |   | 6/1985  | Ikuma et al.                |
|-----------|----|---|---------|-----------------------------|
| 4,916,196 | A  | * | 4/1990  | Aoki ............ C08F 212/04 |
|           |    |   |         | 526/342                     |
| 6,153,712 | A  | * | 11/2000 | Yamaguchi ..... C08F 212/10 |
|           |    |   |         | 526/307.1                   |
| 6,384,129 | B1 |   | 5/2002  | Lowry                       |
| 2004/0097648 | A1 |   | 5/2004 | Nakai et al.                |
| 2015/0376316 | A1 | * | 12/2015 | Heo ............. C08F 212/12 |
|           |    |   |         | 526/233                     |

FOREIGN PATENT DOCUMENTS

| CN | 103059221 A     | 4/2013    |
| CN | 104356272 A     | 2/2015    |
| JP | S61264011 A     | 11/1986   |
| JP | S63162708 A     | 7/1988    |
| JP | H0586105 A      | 4/1993    |
| JP | 05148310 A   *  | 6/1993    |
| JP | H05148310 A     | 6/1993    |
| JP | H0613587 B2     | 2/1994    |
| JP | H06248017 A     | 9/1994    |
| JP | H09176213 A     | 7/1997    |
| JP | 2002338608 A    | 11/2002   |
| JP | 3469264 B2   *  | 11/2003   |
| KR | 10-19950006130 B1 | 6/1995  |
| KR | 10-0266053 B1   | 9/2000    |
| KR | 10-2006-0013437 A | 2/2006  |
| KR | 10-1739621 B1   | 6/2017    |
| KR | 10-2019-0063274 A | 6/2019  |
| KR | 10-2019-0134452 A | 12/2019 |

OTHER PUBLICATIONS

JP-05148310-A, Sep. 1993, Machine translation (Year: 1993).*
JP 3469264 B2, 2003, Machine translation (Year: 2003).*
Extended European Search Report for related application No. EP20896323.1, mailed Jul. 21, 2022.

* cited by examiner

*Primary Examiner* — Satya B Sastri

(57) ABSTRACT

Provided is a method of preparing a maleimide-based copolymer, which comprises adding a monomer mixture including an aromatic vinyl-based monomer and a maleimide-based monomer to an aqueous solution consisting of an aqueous solvent and a first vinyl cyanide-based monomer and performing polymerization.

8 Claims, No Drawings

METHOD OF PREPARING MALEIMIDE-BASED COPOLYMER

TECHNICAL FIELD

Cross-Reference to Related Application

This application is a National Phase of International Application No. PCT/KR2020/016774, filed Nov. 25, 2020, which claims priority to and the benefit of Korean Patent Application No. 10-2019-0160503, filed on Dec. 5, 2019, and Korean Patent Application No. 10-2020-0158008, filed on Nov. 23, 2020, the disclosures of which are incorporated herein by reference in their entirety.

Technical Field

The present invention relates to a method of preparing a maleimide-based copolymer, and specifically, to a method of preparing a maleimide-based copolymer using an aqueous solution including an aqueous solvent and a vinyl cyanide-based monomer.

BACKGROUND ART

In order to increase the heat resistance of a diene-based rubber graft polymer, a method of introducing a new monomer into an aromatic vinyl-based polymer, which is a copolymer of a vinyl cyanide-based monomer and an aromatic vinyl-based monomer, to increase a glass transition temperature has been widely used. In particular, a maleimide-based copolymer which is a copolymer of a vinyl cyanide-based monomer, an aromatic vinyl-based monomer, and a maleimide-based monomer has a very high glass transition temperature. However, since the maleimide-based monomer reacts with the aromatic vinyl-based monomer to form a charge transfer complex, an alternating copolymer which is a copolymer of an aromatic vinyl-based monomer and a maleimide-based monomer is produced at the beginning of polymerization, and an aromatic vinyl-based copolymer, which is a copolymer of a vinyl cyanide-based monomer and an aromatic vinyl-based monomer, and a maleimide-based copolymer are produced at the middle and end of polymerization, and thus various types of polymers are produced in one polymerization. To solve this problem, continuous bulk polymerization or solution polymerization is used, but this method has a difficulty in controlling a polymerization temperature due to the heat of reaction and results in a low polymerization conversion rate due to an increase in viscosity, and thus a separate recovery process for recovering unreacted monomers is required.

Therefore, research on preparing a maleimide-based copolymer with a consistent composition by using suspension polymerization that uses a small amount of additive, easily controls the heat of reaction, and achieves a high polymerization conversion rate is being carried out continuously.

DISCLOSURE

Technical Problem

The present invention is directed to providing a method of preparing a maleimide-based copolymer with a consistent composition throughout polymerization.

The present invention is also directed to providing a method of preparing a maleimide-based copolymer, which uses a small amount of additive, easily controls the heat of reaction, and achieves a high polymerization conversion rate.

Technical Solution

One aspect of the present invention provides a method of preparing a maleimide-based copolymer, which comprises adding a monomer mixture including an aromatic vinyl-based monomer and a maleimide-based monomer to an aqueous solution consisting of an aqueous solvent and a first vinyl cyanide-based monomer and performing polymerization.

Advantageous Effects

According to a method of preparing a maleimide-based copolymer of the present invention, a maleimide-based copolymer with a consistent composition throughout polymerization can be prepared. Also, when suspension polymerization is applied to the method of preparing a maleimide-based copolymer of the present invention, a small amount of additive can be used, the heat of reaction can be easily controlled, and a maleimide-based copolymer can be prepared with a high polymerization conversion rate.

Modes of the Invention

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

Definition of Terms

As used herein, the term "first and second vinyl cyanide-based monomers" may be one or more selected from the group consisting of acrylonitrile, methacrylonitrile, phenylacrylonitrile, and α-chloroacrylonitrile, with acrylonitrile being preferred. A unit derived from the vinyl cyanide-based monomer may be a vinyl cyanide-based monomer unit.

As used herein, the term "aromatic vinyl-based monomer" may be one or more selected from the group consisting of styrene, α-methylstyrene, α-ethylstyrene, and p-methylstyrene, with styrene being preferred. A unit derived from the aromatic vinyl-based monomer may be an aromatic vinyl-based monomer unit.

As used herein, the term "maleimide-based monomer" may be one or more selected from the group consisting of maleimide, N-methylmaleimide, N-cyclohexylmaleimide, N-phenylmaleimide, N-(4-chlorophenyl)maleimide, 2-methyl-N-phenylmaleimide, and N-(p-methoxyphenyl) maleimide, with N-phenylmaleimide being preferred. A unit derived from the maleimide-based monomer may be a maleimide-based monomer unit.

As used herein, the term "maleimide-based copolymer" may mean a copolymer of a monomer mixture including a vinyl cyanide-based monomer, an aromatic vinyl-based monomer, and a maleimide-based monomer, that is, a copolymer including a vinyl cyanide-based monomer unit, an aromatic vinyl-based monomer unit, and a maleimide-based monomer unit as essential components.

As used herein, the term "aromatic vinyl-based copolymer" may mean a copolymer of a vinyl cyanide-based monomer and an aromatic vinyl-based monomer, that is, a copolymer consisting of a vinyl cyanide-based monomer unit and an aromatic vinyl-based monomer unit.

As used herein, the term "aqueous solvent" may be one or more selected from the group consisting of distilled water and ion-exchanged water.

As used herein, the term "polymerization conversion rate (%)" may be obtained by the following method.

A specific amount of maleimide-based copolymer is completely dissolved in tetrahydrofuran, methanol is then added to obtain a precipitate, and the precipitate is dried under vacuum to completely remove a solvent, thereby obtaining a sample. Then, the sample is weighed, and the weight of the sample is substituted into the following equation to calculate a polymerization conversion rate.

Polymerization conversion rate (%)=(Weight of sample)/(Total weight of monomers added in preparation of specific amount of maleimide-based copolymer)×100

Method of Preparing Maleimide-Based Copolymer

A method of preparing a maleimide-based copolymer according to an embodiment of the present invention includes adding a monomer mixture including an aromatic vinyl-based monomer and a maleimide-based monomer to an aqueous solution consisting of an aqueous solvent and a first vinyl cyanide-based monomer and performing polymerization.

In this case, it is preferable that the aqueous solution does not include other monomers, specifically, an aromatic vinyl-based monomer, to increase the polymerization conversion rate of a vinyl cyanide-based monomer at the early stage of polymerization.

In addition, it is preferable that the monomer mixture includes a second vinyl cyanide-based monomer to increase the polymerization conversion rate of a vinyl cyanide-based monomer at the early stage of polymerization.

The polymerization may be suspension polymerization that is performed by suspending monomers in the form of a droplet (hereinafter, referred to as a "monomer droplet") in an aqueous solvent. The monomer droplets may not coagulate in the aqueous solvent due to the presence of a suspending agent and stirring, and polymerization may be performed in the monomer droplets.

Meanwhile, since a vinyl cyanide-based monomer is partially water-soluble, vinyl cyanide-based monomers present in an aqueous solution and a monomer droplet may move to achieve equilibrium. On the other hand, since a maleimide-based monomer and an aromatic vinyl-based monomer are not water-soluble, they may not move to an aqueous solution or an aqueous solvent but may be present only in a monomer droplet. For this reason, when polymerization is performed after batch-adding a monomer mixture including a vinyl cyanide-based monomer to an aqueous solvent rather than the above-described aqueous solution or when polymerization is performed while continuously adding the monomer mixture to an aqueous solvent, a large amount of the vinyl cyanide-based monomer may move to the aqueous solvent to achieve equilibrium between the aqueous solvent and the vinyl cyanide-based monomer included in the monomer droplet. Therefore, since polymerization is performed in a state in which the amount of the vinyl cyanide-based monomer included in the monomer droplet is substantially lower than the amount of the vinyl cyanide-based monomer included in the monomer mixture at the early stage of polymerization, a maleimide-based polymer prepared at the early stage of polymerization includes a substantially small amount of vinyl cyanide-based monomer unit. In addition, when the vinyl cyanide-based monomer present in the monomer droplet is consumed as polymerization proceeds, the vinyl cyanide-based monomer that has moved to the aqueous solvent moves to the inside of the monomer droplet again, and polymerization is performed. As a result, a maleimide-based polymer with an inconsistent composition throughout polymerization may be prepared.

However, when the monomer mixture is added to the aqueous solution consisting of an aqueous solvent and a first vinyl cyanide-based monomer to form a monomer droplet, the first vinyl cyanide-based monomer or the first vinyl cyanide-based monomer and second vinyl cyanide-based monomer included in the resulting aqueous solution move to the inside of the monomer droplet to achieve equilibrium of the first vinyl cyanide-based monomer or the first vinyl cyanide-based monomer and second vinyl cyanide-based monomer included in the aqueous solution and the monomer droplet, and thus a large amount of vinyl cyanide-based monomer may participate in polymerization at the early stage of polymerization. Also, since the first vinyl cyanide-based monomer included in the aqueous solution moves to the inside of the monomer droplet at a relatively early time point, a maleimide-based polymer with a consistent composition throughout polymerization may ultimately be prepared.

The aqueous solution may consist of 100.0 parts by weight of the aqueous solvent and 1.0 to 10.0 parts by weight of the first vinyl cyanide-based monomer, preferably 100.0 parts by weight of water and 3.5 to 9.5 parts by weight of the first vinyl cyanide-based monomer, and more preferably 100.0 parts by weight of water and 4.5 to 9.0 parts by weight of the first vinyl cyanide-based monomer. When the above-described ranges are satisfied, the first vinyl cyanide-based monomer can be present in a dissolved state in the aqueous solution. Accordingly, to achieve equilibrium between the amounts of the first vinyl cyanide-based monomer or the first vinyl cyanide-based monomer and second vinyl cyanide-based monomer in the aqueous solution and the monomer droplet, the first vinyl cyanide-based monomer or the first vinyl cyanide-based monomer and second vinyl cyanide-based monomer can easily move to the monomer droplet, and thus a relatively large amount of the first vinyl cyanide-based monomer or the first vinyl cyanide-based monomer and second vinyl cyanide-based monomer can participate in polymerization at the early stage of the polymerization. Also, a maleimide-based polymer with a consistent composition throughout polymerization can be prepared.

In addition, when the monomer mixture includes the second vinyl cyanide-based monomer, it is preferable that the aqueous solution includes the first vinyl cyanide-based monomer in an amount of 30.0 to 90.0 parts by weight, preferably 40.0 to 85.0 parts by weight, and more preferably 50.0 to 85.0 parts by weight, with respect to 100.0 parts by weight of the sum of the first vinyl cyanide-based monomer and the second vinyl cyanide-based monomer. When the above-described range is satisfied, to achieve equilibrium between the amounts of the first and second vinyl cyanide-based monomers in the aqueous solution and the monomer droplet, the first and second vinyl cyanide-based monomers can easily move to the monomer droplet, and thus a relatively large amount of first and second vinyl cyanide-based monomers can participate in polymerization at the early stage of polymerization. Also, a maleimide-based polymer with a consistent composition throughout polymerization can be prepared.

Meanwhile, with respect to 100 parts by weight of the sum of the monomers added in the method of preparing a maleimide-based polymer, 5 to 20 parts by weight of the first vinyl cyanide-based monomer, 40 to 55 parts by weight of the aromatic vinyl-based monomer, and 32 to 47 parts by weight of the maleimide-based monomer may be input into a reactor. Preferably, 7 to 18 parts by weight of the first vinyl cyanide-based monomer, 43 to 52 parts by weight of the aromatic vinyl-based monomer, and 35 to 45 parts by weight of the maleimide-based monomer may be input into a reactor.

When the second vinyl cyanide-based monomer is also added, with respect to 100 parts by weight of the sum of the monomers added in the method of preparing a maleimide-based polymer, 5 to 20 parts by weight of the sum of the first and second vinyl cyanide-based monomers, 40 to 55 parts by weight of the aromatic vinyl-based monomer, and 32 to 47 parts by weight of the maleimide-based monomer may be input into a reactor. Preferably, 7 to 18 parts by weight of the sum of the first and second vinyl cyanide-based monomers, 43 to 52 parts by weight of the aromatic vinyl-based monomer, and 35 to 45 parts by weight of the maleimide-based monomer may be input into a reactor. When the above-described condition is satisfied, a maleimide-based polymer excellent in all of chemical resistance, processability, and heat resistance can be prepared.

The continuous addition of the monomer mixture may be terminated when a polymerization conversion rate reaches 65.0 to 80.0%, and preferably, 70.0 to 75.0%. When the above-described range is satisfied, a monomer mixture continuously added at the late stage of polymerization can react with the previously produced polymer to allow the polymer to grow. As a result, a maleimide-based copolymer can be prepared with a high polymerization conversion rate.

Meanwhile, polymerization may be performed after batch-adding the monomer mixture to the aqueous solution or while continuously adding the monomer mixture to the aqueous solution, and it is preferable that polymerization is performed while continuously adding the monomer mixture, more preferably, while continuously adding the monomer mixture at a constant rate, for convenience of a process and polymerization stability.

The continuous addition may be performed at a constant temperature, and it is preferable to perform the continuous addition at 100.0 to 120.0° C., and more preferably, 105.0 to 115.0° C. When the above-described range is satisfied, a polymerization rate can be kept constant throughout polymerization.

The polymerization is preferably suspension polymerization that uses a small amount of additive, easily controls the heat of reaction, and increases a polymerization conversion rate.

The method of preparing a maleimide-based copolymer according to the embodiment of the present invention may further include performing polymerization and aging after terminating the continuous addition of the monomer mixture so that a monomer mixture continuously added at the late stage may sufficiently participate in polymerization to allow the previously produced polymer to grow.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Examples 1 to 5

An aqueous solution described in Table 1 below, 0.02 parts by weight of 1-di(t-butylperoxy)cyclohexane, 1.3 parts by weight of tricalcium phosphate, and 0.1 parts by weight of t-dodecyl mercaptan were input into a reactor. The temperature inside the reactor was raised to 110° C. Immediately after the reactor temperature elevation, suspension polymerization was performed while continuously adding a first monomer mixture described in Table 1 below at a constant rate until a polymerization conversion rate reached 70%.

After the continuous addition of the first monomer mixture was terminated, polymerization and aging were performed for 180 minutes and then terminated. Subsequently, formic acid was input into the reactor so that the pH of a polymerization slurry became 2.5, and washing, dehydration, and drying were performed to prepare a copolymer in the form of bead.

Comparative Example 1

An aqueous solvent described in Table 2 below, 0.02 parts by weight of 1-di(t-butylperoxy)cyclohexane, 1.3 parts by weight of tricalcium phosphate, and 0.1 parts by weight of t-dodecyl mercaptan were input into a reactor. The temperature inside the reactor was raised to 110° C. Afterward, a second monomer mixture described in Table 2 below was batch-added, and then suspension polymerization was performed for 360 minutes and terminated. Subsequently, formic acid was input into the reactor so that the pH of a polymerization slurry became 2.5, and washing, dehydration, and drying were performed to prepare a copolymer in the form of bead.

Comparative Example 2

An aqueous solvent described in Table 2 below, 0.02 parts by weight of 1,1-di(t-butylperoxy)cyclohexane, 1.3 parts by weight of tricalcium phosphate, and 0.1 parts by weight of t-dodecyl mercaptan were input into a reactor. The temperature inside the reactor was raised to 110° C. Immediately after the reactor temperature elevation, suspension polymerization was performed while continuously adding a third monomer mixture described in Table 2 below at a constant rate until a polymerization conversion rate reached 70%.

After the continuous addition of the third monomer mixture was terminated, polymerization and aging were performed for 180 minutes and then terminated.

Subsequently, formic acid was input into the reactor so that the pH of a polymerization slurry became 2.5, and washing, dehydration, and drying were performed to prepare a copolymer in the form of bead.

Comparative Example 3

An aqueous solution described in Table 2 below, 0.02 parts by weight of 1,1-di(t-butylperoxy)cyclohexane, 1.3 parts by weight of tricalcium phosphate, and 0.1 parts by weight of t-dodecyl mercaptan were input into a reactor. The temperature inside the reactor was raised to 110° C. Immediately after the reactor temperature elevation, suspension polymerization was performed while continuously adding a third monomer mixture described in Table 2 below at a constant rate until a polymerization conversion rate reached 70%.

After the continuous addition of the third monomer mixture was terminated, polymerization and aging were performed for 180 minutes and then terminated. Subsequently, formic acid was input into the reactor so that the pH of a polymerization slurry became 2.5, and washing, dehydration, and drying were performed to prepare a copolymer in the form of bead.

Experimental Example 1

The properties of the maleimide-based copolymers prepared in Examples and Comparative Examples were calculated by methods described below, and results thereof are shown in Tables 1 and 2 below.

(1) Final polymerization conversion rate (%): 4 g of a maleimide-based copolymer was completely dissolved in tetrahydrofuran, and methanol was then added to obtain a precipitate. The obtained precipitate was dried under vacuum to completely remove a solvent, thereby obtaining a sample. The sample was weighed, and the weight of the sample was substituted into the following equation to calculate a final polymerization conversion rate.

Final polymerization conversion rate (%)=(Weight of sample)/(Total weight of monomers added in preparation of 4 g of maleimide-based copolymer)×100

(2) Amount of AN unit in maleimide-based copolymer: A maleimide-based copolymer was collected whenever polymerization conversion rates described in Tables 1 and 2 below were reached during the preparation process of the maleimide-based copolymer, and the amount of an acrylonitrile unit in the maleimide-based copolymer was measured by elemental analysis.

In this case, the polymerization conversion rate was calculated in the same manner as in (1) Final polymerization conversion rate (%).

(3) Glass transition temperature of maleimide-based copolymer: A maleimide-based copolymer was collected whenever polymerization conversion rates described in Tables 1 and 2 below were reached during the preparation process of the maleimide-based copolymer, and the glass transition temperature of the maleimide-based copolymer was measured by differential scanning calorimetry.

In this case, the polymerization conversion rate was calculated in the same manner as in (1) Final polymerization conversion rate (%).

TABLE 1

| Classification | | | | Examples 1 | 2 | 3 | 4 | 5 |
|---|---|---|---|---|---|---|---|---|
| Preparation method | Aqueous solution (parts by weight) | | Distilled water | 140.0 | 140.0 | 140.0 | 140.0 | 140.0 |
| | | | AN | 4.2 | 5.6 | 7.0 | 9.8 | 12.0 |
| | First monomer mixture (parts by weight) | | AN | 7.8 | 6.4 | 5.0 | 2.2 | 0 |
| | | | ST | 48.0 | 48.0 | 48.0 | 48.0 | 48.0 |
| | | | PMI | 40.0 | 40.0 | 40.0 | 40.0 | 40 |
| Maleimide-based copolymer | Final polymerization conversion rate (%) | | | 94.2 | 94.6 | 94.5 | 94.8 | 94.5 |
| | Amount of AN unit (wt %) | Polymerization conversion rate | 15 | 3.5 | 4.3 | 5.6 | 6.7 | 6.8 |
| | | | 30 | 3.8 | 4.5 | 5.9 | 7.2 | 7.1 |
| | | | 50 | 4.5 | 5.2 | 6.2 | 7.7 | 7.7 |
| | | | 70 | 5.9 | 6.4 | 7.1 | 8.6 | 8.5 |
| | | | 90 | 10.1 | 10.2 | 10.2 | 10.3 | 10.3 |
| | Glass transition Temperature | Polymerization conversion rate | 15 | 204.3 | 199.4 | 192.5 | 183.2 | 183.0 |
| | | | 30 | 200.8 | 496.7 | 190.2 | 180.0 | 179.9 |
| | | | 50 | 198.6 | 193.8 | 189.1 | 178.2 | 178.3 |
| | | | 70 | 190.1 | 186.2 | 182.6 | 175.2 | 175.1 |
| | | | 90 | 170.1 | 170.4 | 171.2 | 172.1 | 172.0 |

AN: Acrylonitrile
ST: Styrene
PMI: N-Phenylmaleimide

TABLE 2

| Classification | | | Comparative Examples 1 | 2 | 3 |
|---|---|---|---|---|---|
| Preparation method | Aqueous solvent (parts by weight) | Distilled water | 140.0 | 140.0 | 0 |
| | Aqueous solution (parts by weight) | Distilled water | 0 | 0 | 140.0 |
| | | AN | 0 | 0 | 7.0 |
| | | ST | 0 | 0 | 28 |
| | Second monomer mixture (parts by weight) | AN | 12.0 | 0 | 0 |
| | | ST | 48.0 | 0 | 0 |
| | | PMI | 40.0 | 0 | 0 |
| | Third monomer mixture (parts by weight) | AN | 0 | 12.0 | 5.0 |
| | | ST | 0 | 48.0 | 20.0 |
| | | PMI | 0 | 40.0 | 40.0 |

TABLE 2-continued

|  |  |  |  | Comparative Examples | | |
|---|---|---|---|---|---|---|
| Classification | | | | 1 | 2 | 3 |
| Maleimide-based copolymer | Final polymerization conversion rate (%) | | | 94.6 | 94.3 | 94.5 |
| | Amount of AN unit (wt %) | Polymerization conversion rate | 15 | 2.3 | 2.2 | 2.2 |
| | | | 30 | 2.7 | 2.3 | 2.5 |
| | | | 50 | 3.3 | 2.9 | 3.1 |
| | | | 70 | 5.2 | 4.2 | 5.0 |
| | | | 90 | 10.2 | 10.1 | 10.2 |
| | Glass transition temperature | Polymerization conversion rate | 15 | 216.4 | 215.8 | 216.0 |
| | | | 30 | 209.8 | 213.2 | 212.6 |
| | | | 50 | 205.5 | 208.1 | 207.4 |
| | | | 70 | 194.8 | 199.2 | 198.8 |
| | | | 90 | 168.3 | 167.7 | 168.1 |

AN: Acrylonitrile
ST: Styrene
PMI: N-Phenylmaleimide

Referring to Tables 1 and 2, in the case of Examples 1 to 5 in which suspension polymerization was performed while continuously adding a first monomer mixture to an aqueous solution, it can be confirmed that maleimide-based copolymers having no great difference in the amount of acrylonitrile-based units throughout polymerization were prepared, as compared to Comparative Example 1 in which suspension polymerization was performed after a second monomer mixture was batch-added to an aqueous solvent, Comparative Example 2 in which suspension polymerization was performed while continuously adding a third monomer mixture to an aqueous solvent, and Comparative Example 3 in which suspension polymerization was performed while continuously adding a third monomer mixture to an aqueous solution including styrene and acrylonitrile. Also, it can be confirmed that, since N-phenylmaleimide did not excessively participate in polymerization at the early and middle stages of the polymerization, maleimide-based copolymers having no great difference in glass transition temperature throughout polymerization were prepared. From these results, it can be predicted that, according to the method of preparing a maleimide-based copolymer of the present invention, specific amounts of a vinyl cyanide-based monomer and a maleimide-based monomer can participate in polymerization throughout the polymerization, and thus a maleimide-based polymer with a consistent composition will be prepared.

The invention claimed is:

1. A method of preparing a maleimide-based copolymer, comprising:
adding a monomer mixture including an aromatic vinyl-based monomer and a maleimide-based monomer to an aqueous solution consisting of an aqueous solvent and a first vinyl cyanide-based monomer and performing polymerization,
wherein the monomer mixture includes a second vinyl cyanide-based monomer, and
wherein an amount of the first vinyl cyanide-based monomer is 30.0 to 90.0 parts by weight with respect to 100.0 parts by weight of the sum of the first vinyl cyanide-based monomer and the second vinyl cyanide-based monomer.

2. The method of claim 1, wherein the polymerization is performed while continuously adding the monomer mixture to the aqueous solution.

3. The method of claim 1, wherein the aqueous solution consists of the aqueous solvent and the first vinyl cyanide-based monomer in a dissolved state.

4. The method of claim 1, wherein the aqueous solution consists of 100.0 parts by weight of water and 1.0 to 10.0 parts by weight of the first vinyl cyanide-based monomer.

5. The method of claim 1, wherein the aqueous solution consists of 100.0 parts by weight of water and 3.5 to 9.5 parts by weight of the first vinyl cyanide-based monomer.

6. The method of claim 1, wherein an amount of the first vinyl cyanide-based monomer is 40.0 to 85.0 parts by weight with respect to 100.0 parts by weight of the sum of the first vinyl cyanide-based monomer and the second vinyl cyanide-based monomer.

7. The method of claim 2, wherein the continuous addition of the monomer mixture is terminated when a polymerization conversion rate reaches 65.0 to 80.0%.

8. The method of claim 1, wherein the polymerization is suspension polymerization.

* * * * *